United States Patent [19]

Nishina

[11] Patent Number: 5,615,372

[45] Date of Patent: Mar. 25, 1997

[54] NETWORK DEFINITION MODIFYING SYSTEM

[75] Inventor: Toshihide Nishina, Kawasaki, Japan

[73] Assignee: Fujitsu Limited, Kawasaki, Japan

[21] Appl. No.: 690,941

[22] Filed: Aug. 1, 1996

Related U.S. Application Data

[63] Continuation of Ser. No. 248,488, May 24, 1994, abandoned.

[30] Foreign Application Priority Data

Sep. 8, 1993 [JP] Japan ..................... 5-223338

[51] Int. Cl.⁶ .................... H04L 12/28; G06F 15/177
[52] U.S. Cl. .................. 395/653; 395/200.1; 395/830; 395/685; 395/615; 364/282.1; 364/284.4; 364/DIG. 1
[58] Field of Search ................... 395/700, 600, 395/653, 650, 200.1, 830; 364/282.1, 284.4

[56] References Cited

U.S. PATENT DOCUMENTS

| | | | |
|---|---|---|---|
| 5,293,379 | 3/1994 | Carr | 370/94.1 |
| 5,327,560 | 7/1994 | Hirata et al. | 395/700 |
| 5,418,957 | 5/1995 | Narayan | 395/700 |

*Primary Examiner*—Kevin A. Kriess
*Assistant Examiner*—Michael T. Richey
*Attorney, Agent, or Firm*—Armstrong, Westerman, Hattori, McLeland & Naughton

[57] ABSTRACT

A network definition modifying system is provided which is capable of modifying the definition of a local computer system independently of operational states of other computer systems. The system comprises network definition processing means capable of modifying the definition information, a definition database for storing the definition information, communication means for communicating with other computer systems, definition linkage command processing means for receiving a command, definition linkage main processing means for exchanging the definition information, and a definition directory for storing record information relating to the exchange of the definition information. When the definition linkage command processing means is supplied with a definition exchange command, the definition linkage main processing means distributes the definition information of the local computer system to other computer systems or retrieves the definition information of another system to the local system. The record information relating to the exchange of the definition information is stored in the definition directory, and information specifying the transmitted definition information and information indicating the time of definition are looked up, added, or updated each time the definition information is exchanged.

2 Claims, 8 Drawing Sheets

51 DESTINATION INFORMATION DIRECTORY

| DESTINATION SYSTEM | EDITION NO. OF TRANSMITTED INFORMATION |
|---|---|
| SYSTEM B | |
| SYSTEM C | |
| SYSTEM D | |

51a — DESTINATION SYSTEM column, 51b — EDITION NO. OF TRANSMITTED INFORMATION column

FIG.3

52 RESOURCE INFORMATION DIRECTORY

| RESOURCE NAME | LOCATION OF DEFINITION INFORMATION IN DATABASE | EDITION NO. OF DEFINITION | NAME OF DEFINED SYSTEM |
|---|---|---|---|
| | | | |

NETWORK DEFINITION MODIFYING SYSTEM

This application is a continuation of application Ser. No. 08/248,488 filed May 24, 1994, now abandoned.

BACKGROUND OF THE INVENTION

(1) Field of the Invention

The present invention relates to a network definition modifying system, and more particularly, to a network definition modifying system which permits the definition of a network resource of a local computer system in a network to be modified independently of the operational states of other computer systems connected to the network.

(2) Description of the Related Art

In a network including a plurality of computer systems connected to one another, each system has a network definition which defines information about the network resource of its own system, as well as network definitions defining information about the network resources under the control of the other systems. When data communication is performed, the network resource of a local system is connected to that of a destination system in accordance with the network definitions.

FIG. 10 illustrates the configuration of a conventional network definition modifying system. In the center of the figure is shown a network 100a, which may be a leased line network or public switched network having a larger scale than a local area network. A plurality of computer systems, in the illustrated example, four computer systems 200a, 300a, 400a and 500a, are connected to the network 100a. These computer systems 200a, 300a, 400a and 500a each include a host computer to which several hundreds of user terminals, for example, are connected, though not shown in the figure.

The computer systems 200a, 300a, 400a and 500a have similar functions; therefore, the configuration of only one computer system is explained below taking the system 200a as a typical example. The computer system 200a comprises a console 201a which allows entry of data for the definition or modification of the network resource of its own system 200a and the network resources of the other systems; network definition processing means 202 for carrying out the definition or modification of network resources in accordance with the operation of the console 201a; a definition database 203 storing the definition information on network resources defined or modified by the network definition processing means 202; and communication means 206 which permits data communications between the network resource of its own system 200a and that of a target or destination system via the network 100a in accordance with the definition information on the network resource of its own system and that of the target system stored in the definition database 203.

In the definition database 203 are defined an address of the network resource of its own computer system 200a, a network address for entering the network, and addresses of the network resources of the other computer systems 300a, 400a and 500a. The communication means 206 is provided with a communications program and software including a telecommunications access method, and in the case of using such network resources for communications, the means 206 further defines an address of the network resource so that the network resource may be recognizable from the other systems.

When carrying out data communications through the communication means 206, the communications program specifies the name of the network resource of a destination system, and the access method searches the definition database for the addresses of the terminal of its own system and the terminal of the destination system, and then connects the systems to each other.

In the case where a configuration change has been made to the network resource of the local computer system 200a, the contents of the definitions in the definition database 203 are modified from the console 201a via the network definition processing means 202. For example, when a new terminal is connected to the computer system 200a, an address indicating the location of the terminal is additionally defined in the definition database 203.

Since the other systems cannot recognize the newly added terminal, the modified definition information is reflected in the definition databases of all related computer systems 300a, 400a and 500a. Namely, the definition information is exchanged with each of the computer systems 300a, 400a and 500a.

Thus, when the configuration of a system in the network is changed, it is necessary that the definition information be exchanged with each of the other systems, and exchanging the definition information between the systems permits automatic updating of the definition information in all systems. However, the time for changing the configuration is generally unforeseeable, therefore, the individual systems must always be in a state ready for communication with other systems. This inevitably involves a problem in that the systems between which the definition information is transferred must be operated according to an identical operation pattern, that is, the systems must be started and stopped at the same time.

Conventionally, two methods have been employed to transfer the definition information about network resource between systems. In the first method, the definition information is merely stored in a designated database. The second method utilizes a service that a duplicate of the definition information about the system is transferred when required, the service is included in a network directory system wherein vast resources are managed by means of a tree structure.

The first method requires a database for storing the definition information to be transmitted or received. Further, the definition of the network resource transferred to the database must first be converted to a format that the communication means can handle, and then stored in the definition database accessible from the communication means.

In the second method, the definition information must first be converted from the format which the database of the network directory system uses to a format that the communication means can handle, and then stored in the definition database accessible from the communication means. Furthermore, the network directory system must be in a state that the service for reading out a duplicate of the definition information is available.

In either method, even though the definition information on network resource is transferred successfully, it is not possible to determine whether the definition information has been properly converted to the format which the communication means can handle or whether the definition information has been stored in the target resource database. Further, in the case of using the network directory system, as in the second method, the required functions are not available unless the system is in operation.

SUMMARY OF THE INVENTION

An object of the present invention is to provide a network definition modifying system for modifying the definitions of network resources owned by respective computer systems connected to a network, which system permits the definition of a local computer system to be modified independently of operational states of the other computer systems and which can stop the operation of a local computer system even in the process of the definition modification of other computer systems.

To achieve the above object, the present invention provides a network definition modifying system for modifying definitions of network resources owned by respective computer systems connected to a network. The network definition modifying system comprises definition linkage command processing means for instructing an exchange operation when supplied with a command to exchange definition information about a network resource, network definition processing means for defining and modifying the network resource of a local computer system associated therewith, via the definition linkage command processing means a definition database for storing definition information about the network resource defined or modified by the network definition processing means, definition linkage main processing means for distributing the definition information of the local computer system to another computer system and for retrieving the definition information of another computer system to the local computer system, in accordance with a command from the definition linkage command processing means, a definition directory for storing transmission information specifying the definition information transmitted from the local computer system to another computer system by the definition linkage main processing means, and information indicating times at which the network resources of the local computer system and other computer systems are defined, and communication means for transmitting and receiving the definition information under control of the definition linkage main processing means.

The above and other objects, features and advantages of the present invention will become apparent from the following description when taken in conjunction with the accompanying drawings which illustrate preferred embodiments of the present invention by way of example.

BRIEF DESCRIPTION OF THE DRAWINGS

FIG. 3 is a diagram illustrating a destination information directory stored in a definition directory;

FIG. 4 is a diagram illustrating a resource information directory stored in the definition directory;

DESCRIPTION OF THE PREFERRED EMBODIMENTS

An embodiment according to the present invention will be outlined first.

Figure 1:
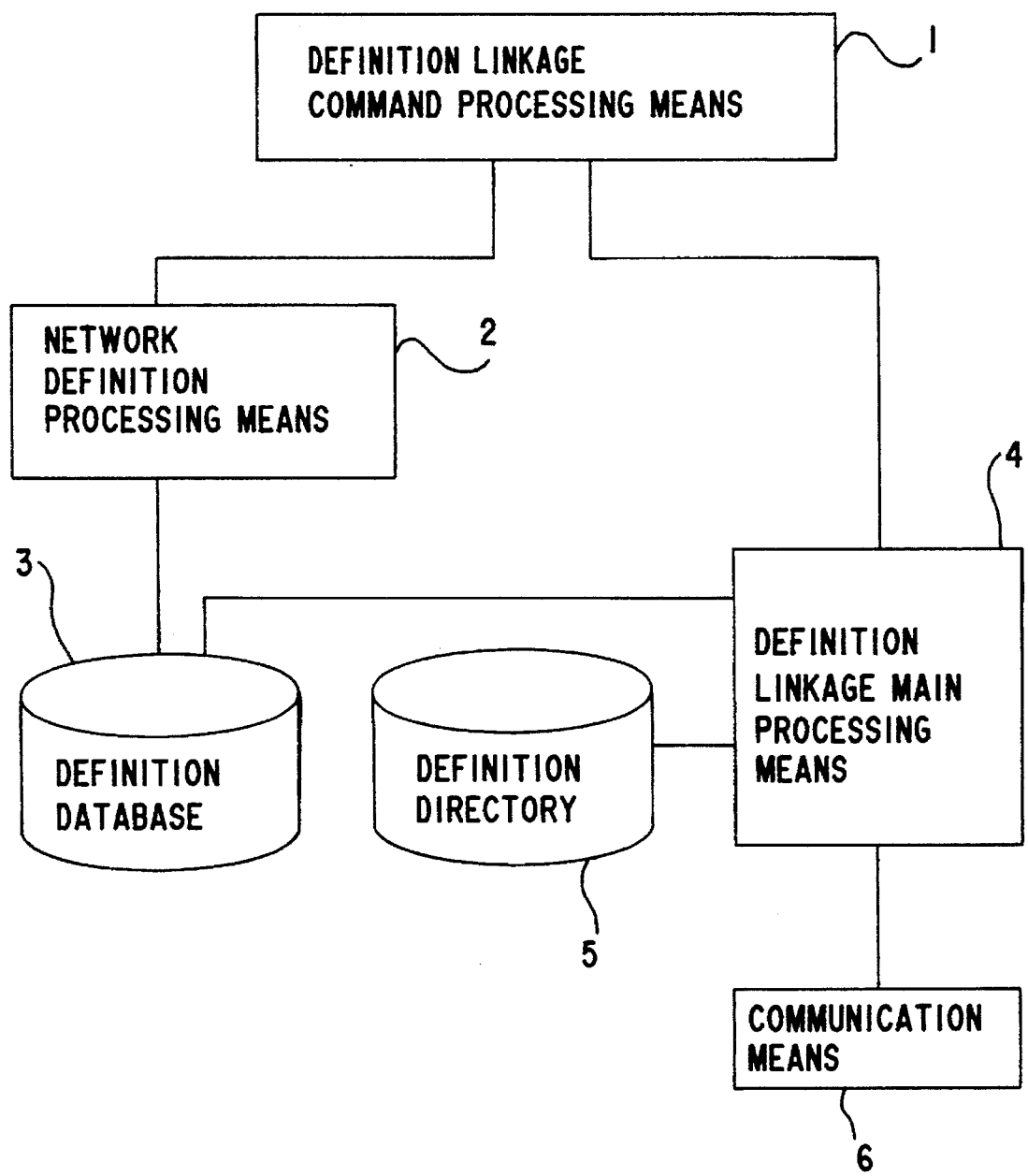
FIG. 1 is a diagram illustrating principles of the present invention.

FIG. 1 illustrates the principles of the present invention for achieving the aforementioned object. As shown in the figure, a network definition modifying system according to the present invention comprises definition linkage command processing means 1 for receiving commands related to definition information about network resources, network definition processing means 2 capable of modifying the definition information, a definition database 3 storing the definition information, definition linkage main processing means 4 for carrying out exchange of the definition information, a definition directory 5 for recording information relating to the exchange of the definition information, and communication means 6 for communicating with a destination or target system.

On receiving a command entered via a console, the definition linkage command processing means 1 interprets the command, and if the command is an add/modify command to add or modify definition information about the network resource, the means 1 instructs the network definition processing means 2 to carry out a modification. In accordance with the instruction, the network definition processing means 2 defines the network resources of its own system or modifies the previously defined information, the information thus defined or modified being stored in the definition database 3.

When supplied with a definition exchange command, the definition linkage command processing means 1 transfers the command to the definition linkage main processing means 4, whereby the definition information of this local system is distributed to other systems or definition information is acquired from other systems to be stored in this system. Information about the exchange of the definition information is stored in the definition directory 5, and each time a definition exchange is carried out, data representing the transmission of the definition information and data representing the time of the definition are looked up, added, or updated. The communication means 6 transmits or receives definition information to or from the other systems.

The embodiment of the present invention will be now described in more detail.

Figure 2:
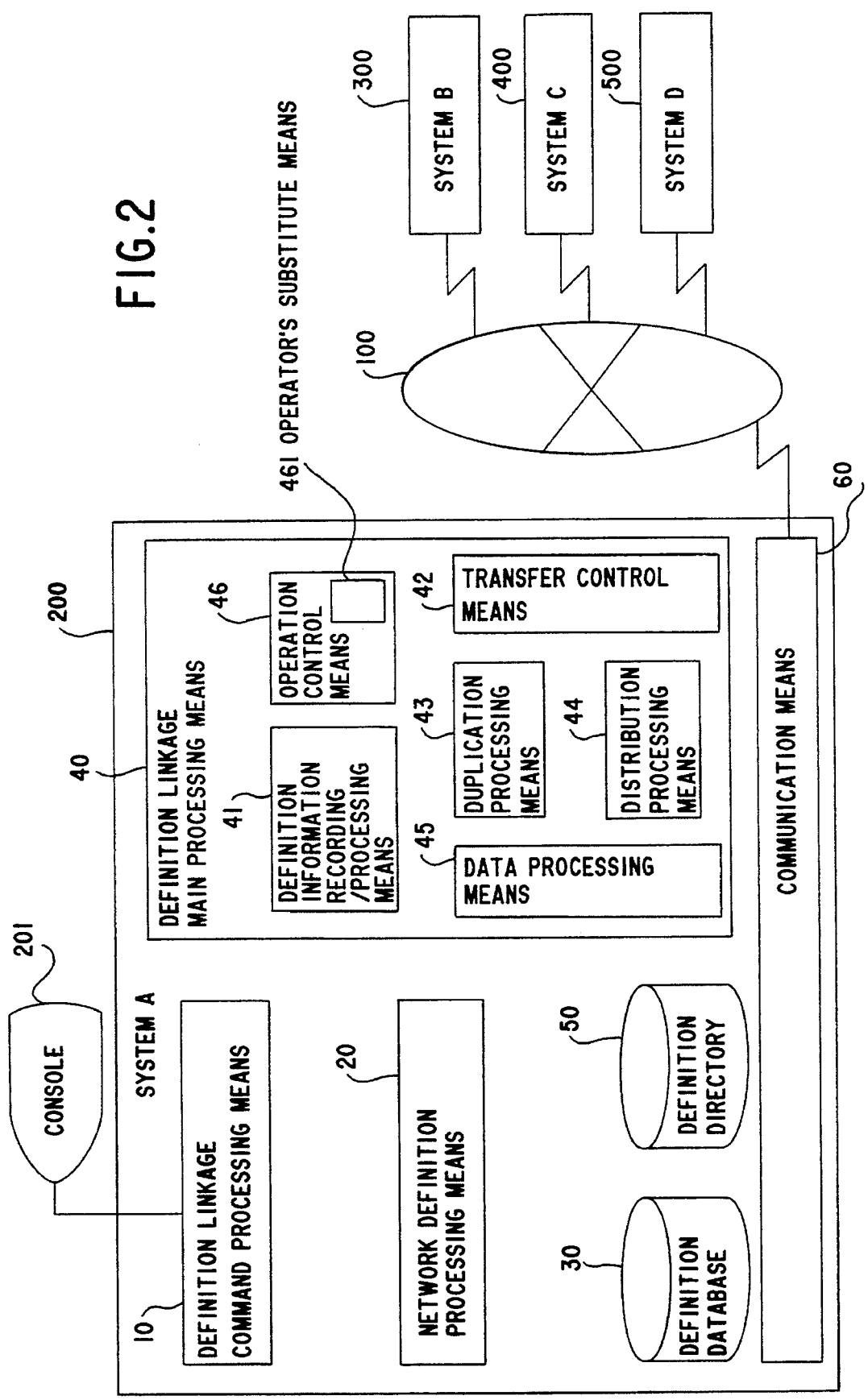
FIG. 2 is a diagram illustrating a system configuration according to one embodiment of the present invention.

FIG. 2 illustrates the configuration of the embodiment according to the invention. A plurality of computer systems, in the illustrated example, four computer systems 200, 300, 400 and 500, are connected to a network 100. These computer systems 200, 300, 400 and 500 each include a host computer, which is, though not shown, connected to a large number of user terminals.

The computer systems 200, 300, 400 and 500 have an identical function in respect of the modification of network definition; therefore, the computer system 200 alone will be explained below. To the computer system 200 is connected a console 201 which permits data entry for the definition or modification of a network resource of its own system. The computer system 200 comprises definition linkage command processing means 10 for receiving a command entered via the console 201; network definition processing means 20 for carrying out definition or modification of the network resource in accordance with the instruction from the definition linkage command processing means 10; a definition database 30 for storing the definition information about the network resource defined or modified by the network definition processing means 20; definition linkage main processing means 40 for exchanging the definition information with all related computer systems 300, 400 and 500 when the definition linkage command processing means 10 is supplied with a definition exchange command; a definition directory 50 for storing data about the exchange of the definition information; and communication means 60 for the exchange of definition information, which transmits the definition information on the network resource of its own computer system 200, stored in the definition database 30, to each of the related systems 300, 400 and 500, and which also receives definition information about the network resources of the other computer systems 300, 400 and 500.

The definition linkage main processing means 40 comprises definition information recording/processing means 41 for writing the definition information into the definition directory 50 when the network resource of its own system is defined or modified; transfer control means 42 for interfacing with the communication means 60; duplication processing means 43 for duplicating the data transmitted from the other systems to be stored in this system; distribution processing means 44 for transmitting the definition information of this system to the other systems; data processing means 45 for interfacing with the definition database 30 and the definition directory 50; and operation control means 46 for globally scheduling the definition linkage main processing means 40.

In the definition database 30 are defined addresses of the network resources which are under the control of the respective computer systems 200, 300, 400 and 500 interconnected by the network 100 for mutual communications. The communication means 60 is provided with a communications program and software including a telecommunications access method for controlling the communications between the communication program or terminal of its own system and the counterpart of a destination or target system. An example of the access method used is a virtual telecommunications access method (VTAM).

FIG. 3 illustrates a destination information directory stored in the definition directory. As illustrated, the destination information directory 51 stored in the definition directory 50 is composed of a column 51a named "DESTINATION SYSTEM," in which the names of the computer systems 300, 400 and 500 are recorded as the destination systems for the computer system 200, and a column 51b named "EDITION NO. OF TRANSMITTED INFORMATION," in which the edition numbers of the definition information on the network resource transmitted to the respective computer systems 300, 400 and 500 are recorded, the numbers of the individual data items corresponding to the number of all computer systems that are potential destinations. In the illustrated example, provided the computer systems 200, 300, 400 and 500 are respectively "SYSTEM A," "SYSTEM B," "SYSTEM C" and "SYSTEM D," then "SYSTEM B," "SYSTEM C" and "SYSTEM D" are recorded in the column "DESTINATION SYSTEM" 51a as the destination systems for the computer system 200.

FIG. 4 illustrates a resource information directory stored in the definition directory. As illustrated, the resource information directory 52 stored in the definition directory 50 is composed of a column 52a labeled "RESOURCE NAME," in which the name of a network resource, such as a terminal or application program, are recorded; a column 52b labeled "LOCATION OF DEFINITION INFORMATION IN DATABASE," in which is stored information as to where in the definition database 30 the definition information about the network resource is stored, i.e., key information used in searching the resource information directory 52; a column 52c labeled "EDITION NO. OF DEFINITION," in which information about the time at which the definition information is created or updated is recorded; and a column 52d labeled "NAME OF DEFINED SYSTEM," in which is stored the name of the system for which the network resource is defined. The number of the data items in the individual columns corresponds to the number of the resources of the local system and the destination systems.

Figure 5:
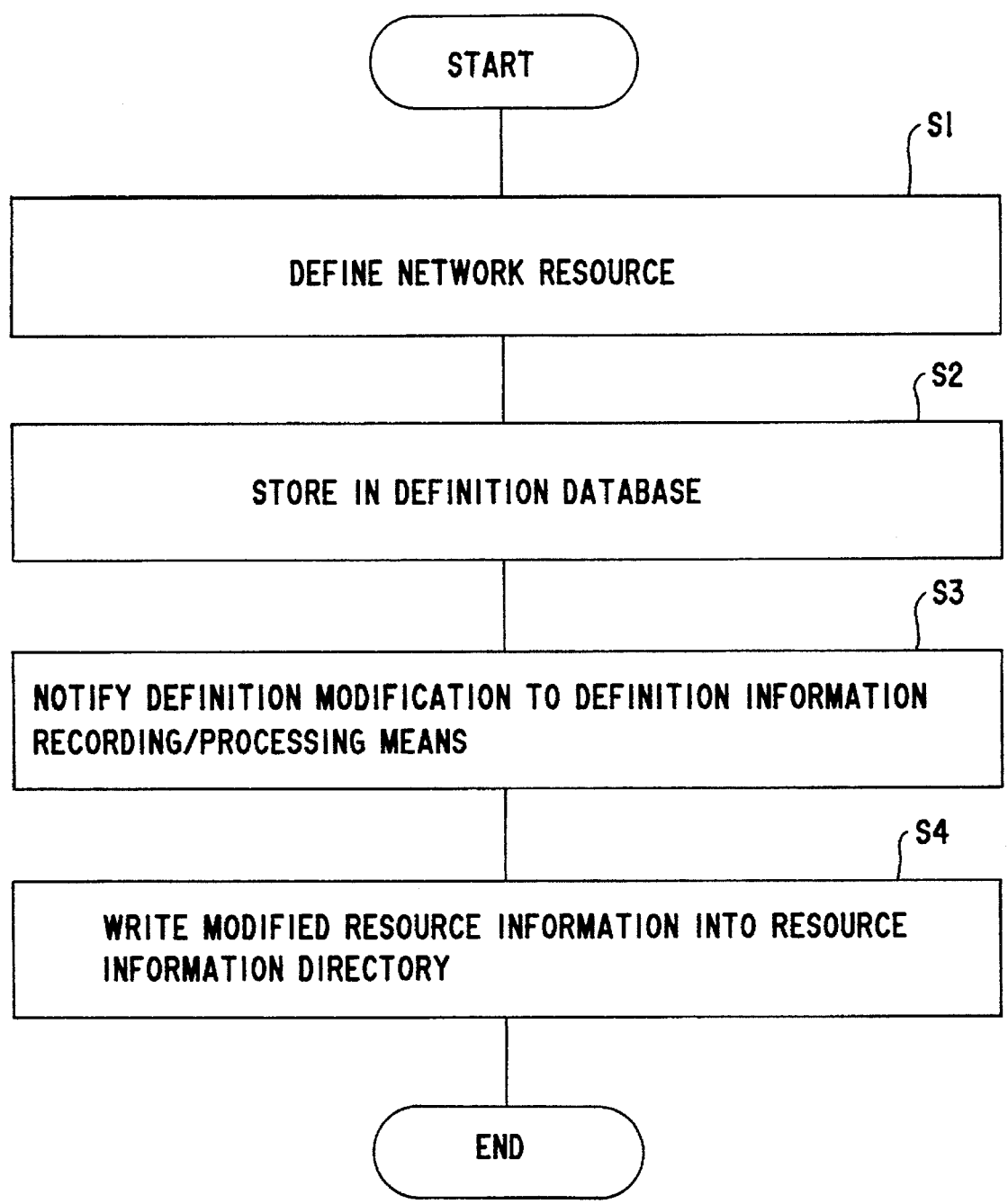
FIG. 5 is a flowchart of a process for defining/modifying the network resource of a local system.

FIG. 5 is a flowchart of a process for defining/modifying the network resource of a local system. In cases where a network resource newly added to the local system is to be defined or the contents of the information already defined need be modified, first, the network resource of the local system is defined by the network definition processing means 20 via the definition linkage command processing means 10, according to a conventional definition modifying method (Step S1). Specifically, when a new network resource is to be defined, an address or the like assigned to this resource is defined, and when the definition information is to be modified, the definition information of the resource concerned is read from the definition database 30 and then redefined after modification.

Subsequently, the thus-defined information on the network resource is stored in the definition database 30 (Step S2). The definition linkage command processing means 10 then notifies the definition information recording/processing means 41 of the definition linkage main processing means 40 that the definition information of the network resource has been modified (Step S3). The definition information recording/processing means 41 writes a name of the defined resource and an edition number representative of the time of the definition, into the resource information directory 52 of the definition directory 50 via the data processing means 45 (Step S4).

Figure 6:
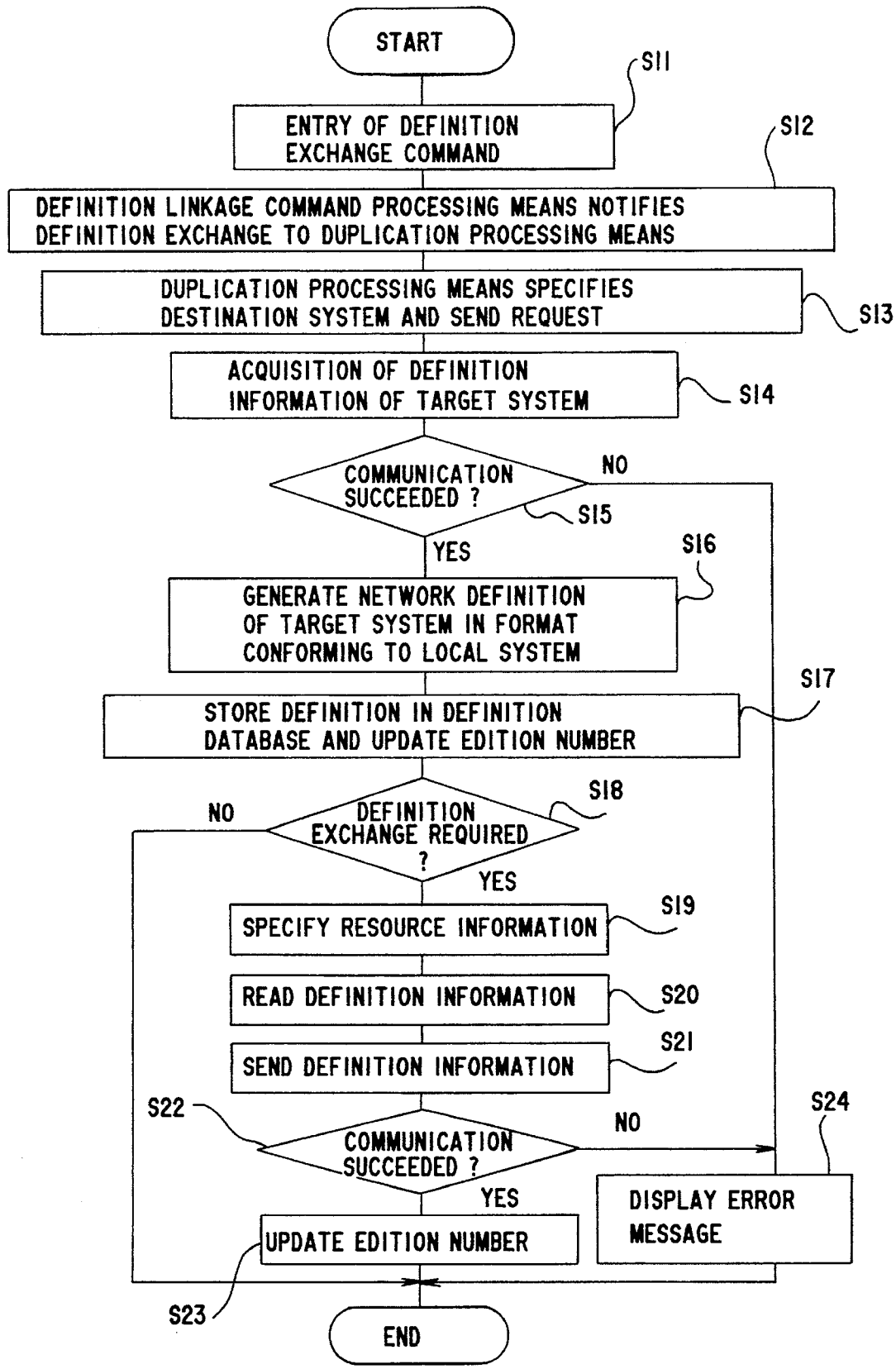
FIG. 6 is a flowchart of a process for exchanging definition information.

FIG. 6 is a flowchart of a process for exchanging the definition information. When the definition of the network resource of a local system has been modified or when the definition of the network resource of another system has expectedly been modified, the definition information is exchanged between the systems.

First, the definition exchange command is entered from the console 201 (Step S11). At this time, a particular system or all systems can be specified as destination or target systems with which the definition is to be exchanged. In cases where there has been no change in the definition of the network resource of the local system, only acquisition of the definition information of network resource from another system can be specified. Further, it is possible to specify whether all definition information is required, such as in case of recovery from fault, or only the modified part is required.

When supplied with the definition exchange command, the definition linkage command processing means 10 analyzes the command and notifies the result to the duplication processing means 43 of the definition linkage main processing means 40 (Step S12). The duplication processing means 43 specifies a destination or target system, based on the definition exchange command or using the destination information directory 51 in the definition directory 50, and sends a request to the destination system via the transfer control means 42 of the definition linkage main processing means 40 and the communication means 60 (Step S13).

On receiving the request, the destination or target system reads the definition information of the network resource of its own system, and sends the read information to the originating system (Step S14). The process of reading the definition information, executed on the part of the target system, will be described later.

Subsequently, it is determined whether the definition information has been successfully received from the target system (Step S15). If received successfully, the definition information from the target system is transferred from the communication means 60 to the data processing means 45 via the transfer control means 42 and the duplication processing means 43 of the definition linkage main processing means 40. Based on the received definition information, the data processing means 45 generates a definition of the network resource of the target system in a data format conforming to the definition database 30 of its own system (Step S16).

The definition of the network resource of the target system, generated by the data processing means 45, is stored in the definition database 30, and the edition number of the corresponding resource in the resource information directory 52 of the definition directory 50 is updated (Step S17).

It is then determined whether the definition exchange command includes a request to send the definition of the resource of the local system to the target system (Step S18). If the command includes no such request to send the definition of the resource of the local system to the target system, this process is immediately ended.

If the definition exchange command includes a request to send the definition information, as in the case where the configuration of the network resource of the local system has been changed, the definition linkage command processing means 10 notifies the request to the distribution processing means 44 of the definition linkage main processing means 40, so that the network resource to be transmitted is specified (Step S19). Specifically, in the case where the request requires a duplication of only the modified information, the distribution processing means 44 looks up the edition number in the destination information directory 51 of the definition directory 50 and the edition number in the resource information directory 52, and specifies the network resource that is modified later than the time indicated by the edition number (the edition number of the transmitted information) in the destination information directory 51. In the case of a duplication of the entire information, the whole network resource of the local system is specified.

Then, the data processing means 45 reads the definition information about the specified network resource from the definition database 30 (Step S20). The distribution processing means 44 transmits the read definition information to the destination system via the transfer control means 42 and the communication means 60 (Step S21). How the destination system processes the received data will be explained later.

It is then determined whether the definition information of the local system has been transmitted successfully (Step S22), and if the transmission is completed successfully, the edition number in the destination information directory 51 of the definition directory 50 is updated (Step S23). In the case where it is judged in Step S15 or S22 that the communication failed, a message indicating the communication failure is displayed (Step S24), and the definition exchange process is ended.

In the procedure shown in FIG. 6, the definition information on network resource of the target system is acquired first, followed by the transmission of the definition information on the network resource from the local system. Conversely, the definition information on the network resource of the local system may be transmitted first, and then the definition information on the network resource of the target network may be acquired. In either case, similar effects are obtained.

Figure 7:
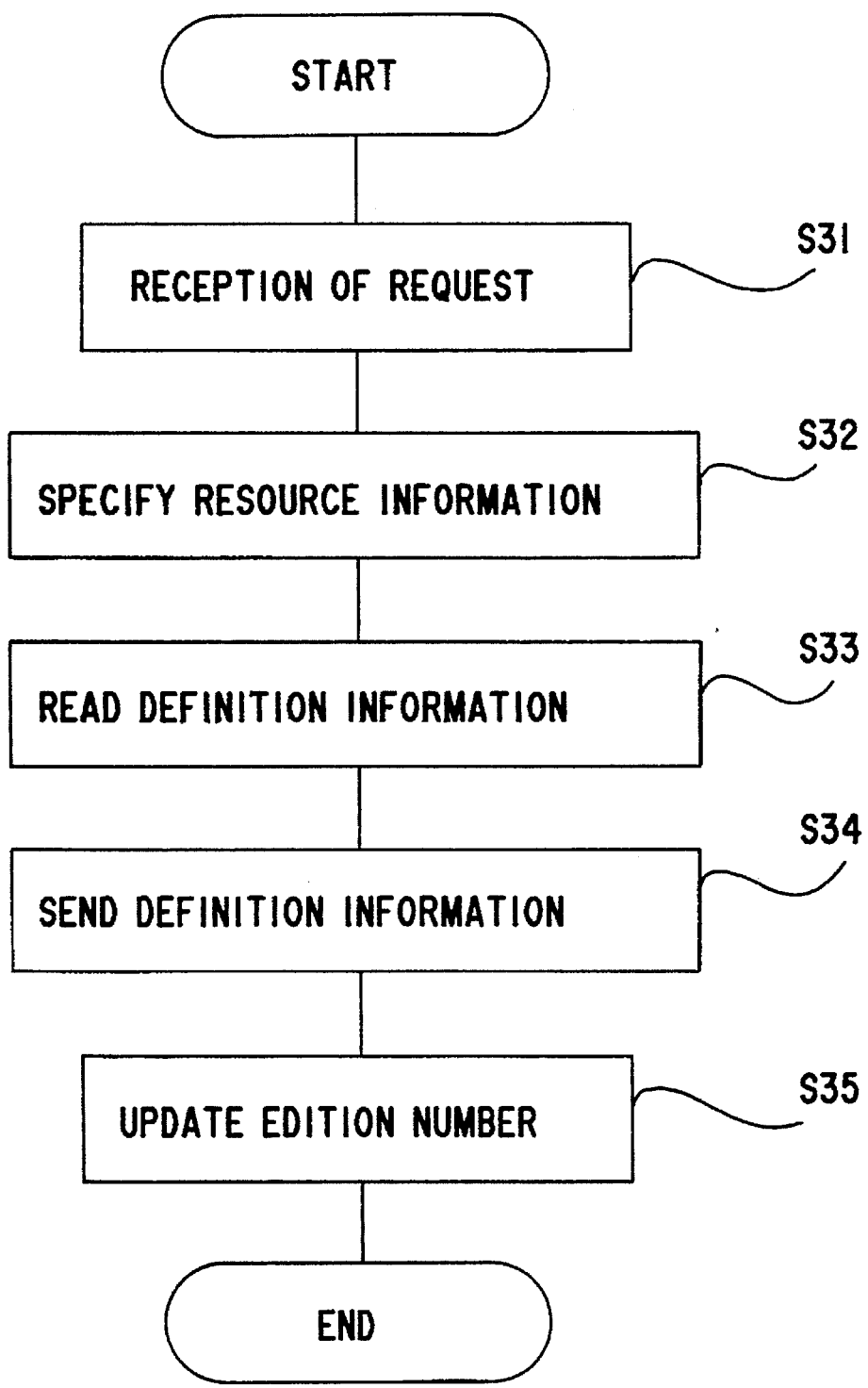
FIG. 7 is a flowchart of a process for reading the definition information.

FIG. 7 is a flowchart of a process for reading the definition information. When a system (target system) is requested to send the definition information on the network resource of its own system, it transfers the request to the distribution processing means 44 via the communication means 60 and the transfer control means 42 of the definition linkage main processing means 40 (Step S31). If the request requires a duplication of only the modified information, the distribution processing means 44 looks up the edition number indicated by the destination information directory 51 of the definition directory 50 and the edition number in the resource information directory 52, and specifies the network resource that is modified later than the time indicated by the edition number (the edition number of the information transmitted last) in the destination information directory 51. In the case of a duplication of the entire information, the whole network resource of this target system is specified (Step S32).

The data processing means 45 reads the definition information about the specified network resource from the definition database 30 (Step S33). The distribution processing means 44 transmits the read definition information to the requesting or source system via the transfer control means 42 and the communication means 60 (Step S34), and finally the edition number in the destination information directory 51 of the definition directory 50 is updated (Step S35).

Figure 8:
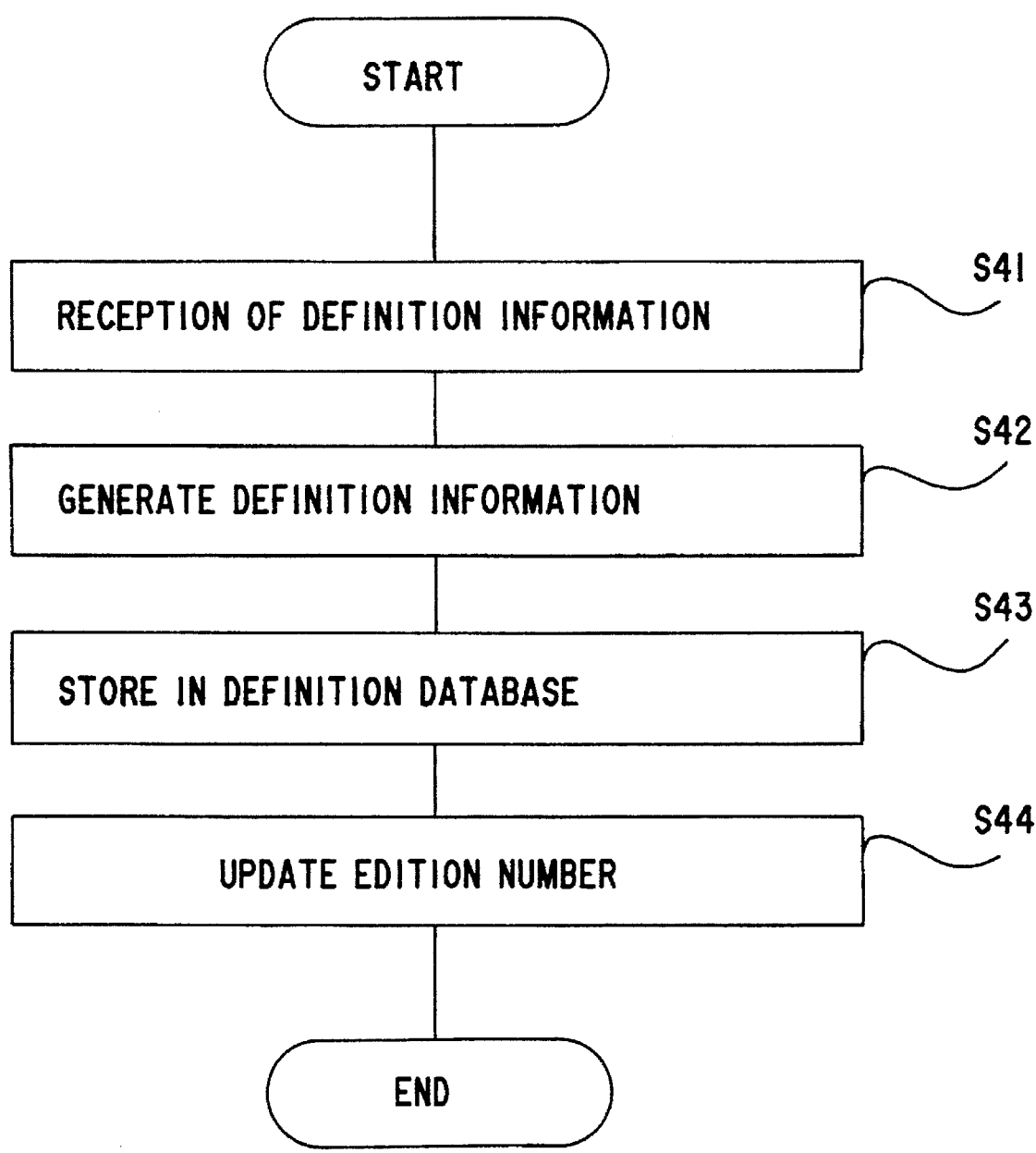
FIG. 8 is a flowchart of a process for writing the definition information.

FIG. 8 is a flowchart of a process for writing the definition information. After the definition information on the network resource of a local system is duplicated and transmitted to a destination or target system, the destination system transfers the received definition information to the duplication processing means 43 via the communication means 60 and the transfer control means 42 of the definition linkage main processing means 40 (Step S41).

The received definition information is then transferred from the duplication processing means 43 to the data processing means 45, and based on this definition information, the data processing means 45 generates definition information about the network resource of the originating system in a data format conforming to the definition database 30 of its own system (Step S42). The definition of the network resource of the originating system, generated by the data processing means 45, is stored in the definition database 30 (Step S43), and finally the edition number of the corresponding resource in the resource information directory 52 of the definition directory 50 is updated (Step S44).

Figure 9:
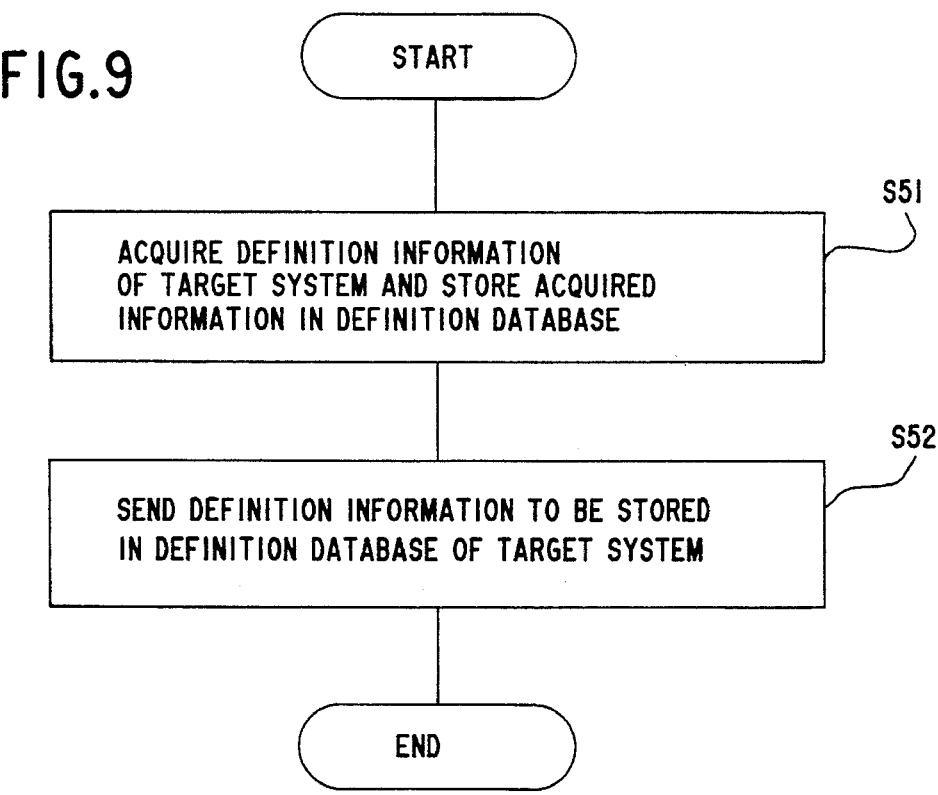
FIG. 9 is a flowchart of a definition exchange process executed when a system is started.
Figure 10:
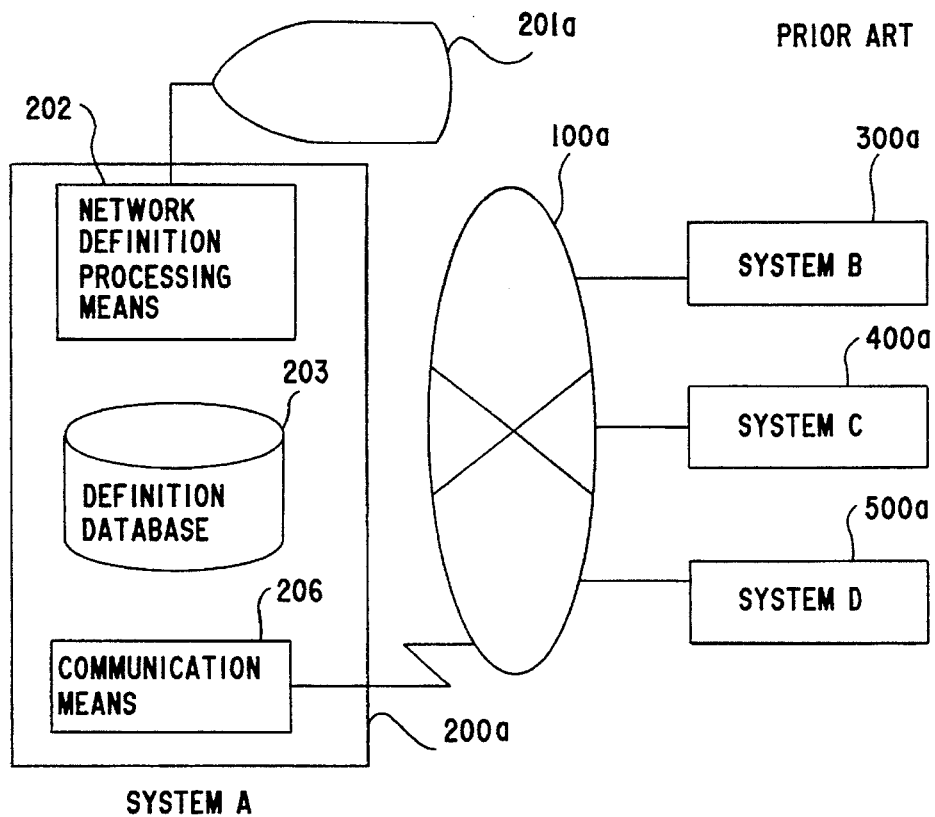
FIG. 10 is a diagram illustrating the configuration of a conventional network definition modifying system.

FIG. 9 is a flowchart of a definition exchange process executed when a system is started. The definitions of network resources can be exchanged between systems connected to the network by means of the definition exchange command, as stated above. In addition, the necessary definition exchange can be automatically carried out at the start of a system, without using the definition exchange command.

To this end, the operation control means 46 of the definition linkage main processing means 40 includes operator's substitute means 461 for scheduling the exchange of modified definition with a target system when a local system is started, as shown in FIG. 2. In the definition information exchange process executed by the operator's substitute means 461, first, information about the modified definition of the target system is acquired each time the local system is started, and the acquired definition information is stored in the definition database 30 (Step S51). Then, the definition information of the local system is transmitted to the target system, whereupon the information about the modified definition is stored in the definition database 30 of the target system (Step S52). Namely, the entry of the definition exchange command in Step S11 of FIG. 6 is substituted by the operator's substitute means 461. This permits the operator to concentrate solely on the management of the definition database 30, without the need to pay attention to the function of definition exchange between systems, as in the case of using a conventional system.

As described above, the present invention additionally includes the definition linkage command processing means, the definition linkage main processing means and the definition directory, so that transfer of the definition information between a local system and each of the other systems can be carried out at any desired time. Accordingly, there is no mutual dependence between the systems when the definition information is exchanged, thus permitting the individual systems in the network to be stopped or restarted independently of one another.

Consequently, in the case where a network is constituted by development-related systems and business-related system groups, for example, the development-related systems can be left operating all day, while the business-related system groups can be operated according to their respective operation schedules, taking account of various factors (e.g., business offices, business days, holidays), whereby the operational capabilities of the systems can be drastically enhanced.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A network definition modifying system for modifying definitions of network resources separately owned by a plurality of computer systems connected to a network, comprising:

a definition database for storing local definition information descriptive of definitions of network resources under control of a local computer system and for storing remote definition information received from remote computer systems as being descriptive of definitions of network resources under control of the remote computer systems;

definition linkage command processing means for instructing a definition exchange operation when supplied with a command to exchange the definitions of network resources between the local computer system and the remote computer systems, which instruction of the definition exchange operation may include an instruction for sending only a modified part of the local definition information to the remote computer systems;

network definition processing means for defining and modifying the network resources of the local computer system and saving the local definition information into said definition information database, in response to said instruction supplied from said definition linkage command processing means;

a definition directory having a resource information directory for storing first edition data and a destination information directory for storing second edition data, said first edition data indicating edition numbers of the local definition information and the remote definition information stored in said definition information database, said second edition data indicating edition numbers of the local definition information sent latest to the respective remote computer systems; and definition linkage main processing means for distributing the local definition information saved in said definition information database to the remote computer systems and for retrieving the remote definition information from the remote computer systems in response to the instruction from said definition linkage command processing means in response to the instruction from said definition linkage command processing means, said definition linkage main processing means comprising definition information recording/processing means for recording said first edition data of the local definition information into said resource information directory of said definition directory when the network resources of the local computer system is defined or modified, and for updating said first edition data of the remote definition information in said resource information directory when the remote definition information is received from the remote computer systems, distribution processing means for transmitting the local definition information to the remote computer systems and updating said second edition data in said destination information directory in response to said instruction from said definition linkage command processing means, wherein said distribution processing means compares said first and second edition data in said definition directory, when the instruction from the definition linkage command processing means requests to send only a modified part of the information, and distributes the local definition information to the respective remote computer systems only when said second edition data is found older than the first edition data, and duplication processing means for requesting the remote computer systems to send the respective definitions of network resources thereof in response to the instruction from the definition linkage command processing means and saving the remote definition information received from the remote computer systems into said definition database.

2. The network definition modifying system according to claim 1, wherein said definition linkage main processing means further comprises operator's substitute means for scheduling an exchange of modified definition information between the local computer system and the remote computer systems when the local computer system starts up.

* * * * *